(12) United States Patent
Goren et al.

(10) Patent No.: US 11,145,283 B2
(45) Date of Patent: Oct. 12, 2021

(54) METHODS AND SYSTEMS FOR VOCALIST PART MAPPING

(71) Applicant: Harmony Helper, LLC, Mount Laurel, NJ (US)

(72) Inventors: Andrew Goren, Mount Laurel, NJ (US); Michael Holroyd, Charlottesville, VA (US); Robert McClure, Philadelphia, PA (US)

(73) Assignee: HARMONY HELPER, LLC, Mount Laurel, NJ (US)

( * ) Notice: Subject to any disclaimer, the term of this patent is extended or adjusted under 35 U.S.C. 154(b) by 0 days.

(21) Appl. No.: 16/739,282

(22) Filed: Jan. 10, 2020

(65) Prior Publication Data

US 2020/0227012 A1    Jul. 16, 2020

Related U.S. Application Data

(60) Provisional application No. 62/790,693, filed on Jan. 10, 2019.

(51) Int. Cl.
*G10G 1/04* (2006.01)
*G06N 7/00* (2006.01)

(52) U.S. Cl.
CPC .............. *G10G 1/04* (2013.01); *G06N 7/005* (2013.01); *G10H 2210/056* (2013.01); *G10H 2210/086* (2013.01)

(58) Field of Classification Search
CPC .... G10G 1/04; G06N 7/005; G10H 2210/056; G10H 2210/086

USPC .......................................................... 84/609
See application file for complete search history.

(56) References Cited

U.S. PATENT DOCUMENTS

| | | | |
|---|---|---|---|
| 5,393,926 A * | 2/1995 | Johnson ............... | G10H 1/0066 84/610 |
| 5,900,567 A * | 5/1999 | Fay ......................... | G10H 1/383 84/613 |
| 6,275,222 B1 * | 8/2001 | Desain .................. | G10H 1/0008 707/914 |
| 6,331,668 B1 * | 12/2001 | Michero ................. | G09B 15/02 84/477 R |
| 7,985,912 B2 * | 7/2011 | Copperwhite ....... | G10H 1/0008 84/609 |
| 10,008,188 B1 * | 6/2018 | Dabon ................... | G10H 1/383 |
| 10,553,188 B2 * | 2/2020 | Li .......................... | G10H 1/0025 |
| 10,810,901 B2 * | 10/2020 | Yan ........................ | G10C 3/00 |

(Continued)

*Primary Examiner* — Christina M Schreiber
(74) *Attorney, Agent, or Firm* — Fox Rothschild LLP; Robert J. Sacco; Carol E. Thorstad-Forsyth

(57) ABSTRACT

Systems and methods for mapping parts in a digital sheet music file for a harmony. The method may include receiving a selection of a music segment for part mapping, receiving a digital sheet music representation of the selected music segment, and determining a plurality of plausible part mapping for the digital sheet music representation. A part mapping identifies one or more distinct musical parts in the digital sheet music representation, each of said one or more distinct musical parts corresponding to a performer of the harmony. The method may also include analyzing one or more features of the plurality of plausible part mapping to identify a highest probability part mapping based on previously stored information, and outputting the highest probability part mapping.

25 Claims, 9 Drawing Sheets

(56) References Cited

U.S. PATENT DOCUMENTS

| | | | | |
|---|---|---|---|---|
| 2002/0090100 | A1* | 7/2002 | Thiede | A61F 11/00 381/314 |
| 2002/0170415 | A1* | 11/2002 | Hruska | G10H 1/42 84/609 |
| 2003/0177887 | A1* | 9/2003 | Tanaka | G10G 1/00 84/609 |
| 2004/0148575 | A1* | 7/2004 | Haase | G10H 1/0008 715/201 |
| 2004/0177745 | A1* | 9/2004 | Kayama | G10H 1/0008 84/609 |
| 2006/0032362 | A1* | 2/2006 | Reynolds | G09B 15/00 84/601 |
| 2008/0302233 | A1* | 12/2008 | Ding | G09B 15/023 84/609 |
| 2009/0031881 | A1* | 2/2009 | Zini | G09B 15/02 84/477 R |
| 2010/0304863 | A1* | 12/2010 | Applewhite | G10H 1/0058 463/36 |
| 2012/0014673 | A1* | 1/2012 | O'Dwyer | G10H 1/40 386/282 |
| 2016/0098977 | A1* | 4/2016 | Maezawa | G10G 1/00 84/602 |
| 2017/0084258 | A1* | 3/2017 | Swiggett | G10H 1/0025 |
| 2017/0092247 | A1* | 3/2017 | Silverstein | G10H 1/0025 |
| 2018/0357990 | A1* | 12/2018 | Goren | G09B 15/009 |
| 2019/0139437 | A1* | 5/2019 | Goren | G10H 1/0008 |
| 2019/0287502 | A1* | 9/2019 | Kiely | G11B 27/031 |
| 2020/0227012 | A1* | 7/2020 | Goren | G10G 1/00 |
| 2021/0030308 | A1* | 2/2021 | Grace | A61B 5/486 |

\* cited by examiner

METHODS AND SYSTEMS FOR VOCALIST PART MAPPING

RELATED APPLICATIONS AND CLAIM OF PRIORITY

This application claims priority to U.S. Provisional Application No. 62/790,693 filed on Jan. 10, 2019, the disclosure of which is fully incorporated into this document by reference.

BACKGROUND

Statement of the Technical Field

This disclosure concerns automated methods and devices which facilitate the creating, practicing and sharing of music, and more particularly concerns methods for transcribing voiced musical notes.

Description of the Related Art

Musical performance is often a collaborative effort among many musicians who interact with each other. A song often comprises separate musical parts performed in harmony that are each comprised of one or more singing voices. A harmony involves a combination of concurrently sounded musical notes which produce a pleasant listening effect. In this regard, harmony is generally understood to require at least two separate tones or voices to be sounded simultaneously. Specifically, the harmony of a song may be further classified into sub-classifications based upon the pitch of the singer's voice that include: soprano, alto, tenor, bass. Furthermore, it is also widely known in the art of music that these harmony sub-classifications can be further defined by additional sub-classifications, such as baritone and contralto. For example, a simple form of harmony would involve a second note sounded at a pitch that is double the pitch of a basic melody. Most commonly, a musical harmony will comprise between two and six voice parts or tones.

In theory, various harmony parts (e.g. vocal harmony parts) could be created separately and then combined to create a song. But in order to create vocal harmonies that have a pleasing sound, vocalists will often work together with producers. For example, this process can take place in a recording studio with the various vocalists present so that they can practice with one another and hear how the combined vocal parts will sound when combined together.

Conventional displays of musical notes exist in which a song to be read is scrolled across a screen while the singer sings the words. However, such displays do not identify different vocal parts in a harmony.

SUMMARY

This document concerns a method and system for mapping parts in a digital sheet music file for a harmony. The system may include a user interface and a processor configured to execute programming instructions stored in a non-transitory computer readable medium for performing the method. In some scenarios, the method may include receiving a selection of a music segment for part mapping, receiving a digital sheet music representation of the selected music segment, and determining a plurality of plausible part mapping for the digital sheet music representation. A part mapping identifies one or more distinct musical parts in the digital sheet music representation, each of said one or more distinct musical parts corresponding to a performer of the harmony. The method may also include analyzing one or more features of the plurality of plausible part mapping to identify a highest probability part mapping based on previously stored information, and outputting the highest probability part mapping.

Optionally, outputting the highest probability part mapping may include presenting the highest probability part mapping to a user as a color coded sheet music that includes a distinct color for representing each musical part of the part as being assigned to a performer of the harmony.

In certain scenarios, the method may also include dividing the received digital sheet music representation into one or more sections based on changes in a number of simultaneously sounded notes between different sections, and performing the identification step separately for each of the one or more sections.

In one or more scenarios, the previously stored information may include information about the selected music segment such as, without limitation, data comprising the selected music segment, a plurality of musical notations, a previous part mapping, a part mapping of another music segment of a music composition that also includes the selected music segment, a sheet music file, information about musical staves, information about performers or instruments for each part or staff, information about lyrics of the music segment, and/or information about accompaniments to the music segment. Optionally, the previously stored information may include information about one or more performers of the harmony such as, without limitation, identification of a part that a performer of the harmony routinely sings, vocal range of a performer of the harmony, the staff a performer of the harmony voices, notes a performer of the harmony voices, identification of one or more specific notes that a performer of the harmony sings, identification of one or more specific lyrics that a performer of the harmony sings, and/or information relating to whether a performer of the harmony sings solo or with a group.

In at least one scenario, the method may also include determining that the highest probability part mapping is not satisfactory when, for example, the highest probability part mapping has an accuracy less than a threshold accuracy, the highest probability part mapping has a probability less than a threshold probability, receipt of user instructions that the highest probability part mapping is not satisfactory, and/or a difference between the probability of the highest probability part mapping and a probability of a second highest probability part mapping is less than a threshold value. Optionally, in response to determining that the highest probability part mapping is not satisfactory, the method may include prompting a user to provide responses to one or more queries, and identifying an updated part mapping based on the responses and the previously stored information. In certain embodiments, prompting the user to provide the responses to one or more queries may include prompting the user to provide a response to at least one of the one or more queries, identifying a first part mapping based on the response to the at least one of the one or more queries and the previously stored information, determining whether the first part mapping is satisfactory, and repeating the prompting, identifying, and determining steps for another one of the one or more queries until the updated part mapping is identified.

Optionally, each of the one or more queries may be related to performers of the harmony such as, without limitation, identification of a part that a performer of the harmony routinely sings, vocal range of a performer of the harmony, the staff a performer of the harmony voices, notes a performer of the harmony voices, identification of one or more specific notes that a performer of the harmony sings, identification of one or more specific lyrics that a performer of the harmony sings and/or information relating to whether a performer of the harmony sings solo or with a group.

In some embodiments, the one or more features may be selected from the group comprising: common vocal ranges for the plurality of musical parts, stable ordering of musical parts in the harmony, a number of notes in the music segment, repeated musical phrases in the music segment, repeated rhythms in the music segment, reinforcement of paired musical parts in the music segment, sparsity of part mapping changes in the music segment, lyrics of the music segment, accompaniments of the music segment, and/or information about one or more performers of the harmony.

In some scenarios, the method may also include assigning a weight to one or more of the features. The weights may be determined based on statistical models generated using real-world examples of part mappings.

Optionally, outputting the highest probability part mapping may include storing the highest probability part mapping for use by a performer of the harmony.

BRIEF DESCRIPTION OF THE DRAWINGS

The solution will be described with reference to the following drawing figures, in which like numerals represent like items throughout the figures, and in which.

DETAILED DESCRIPTION

Figure 1:
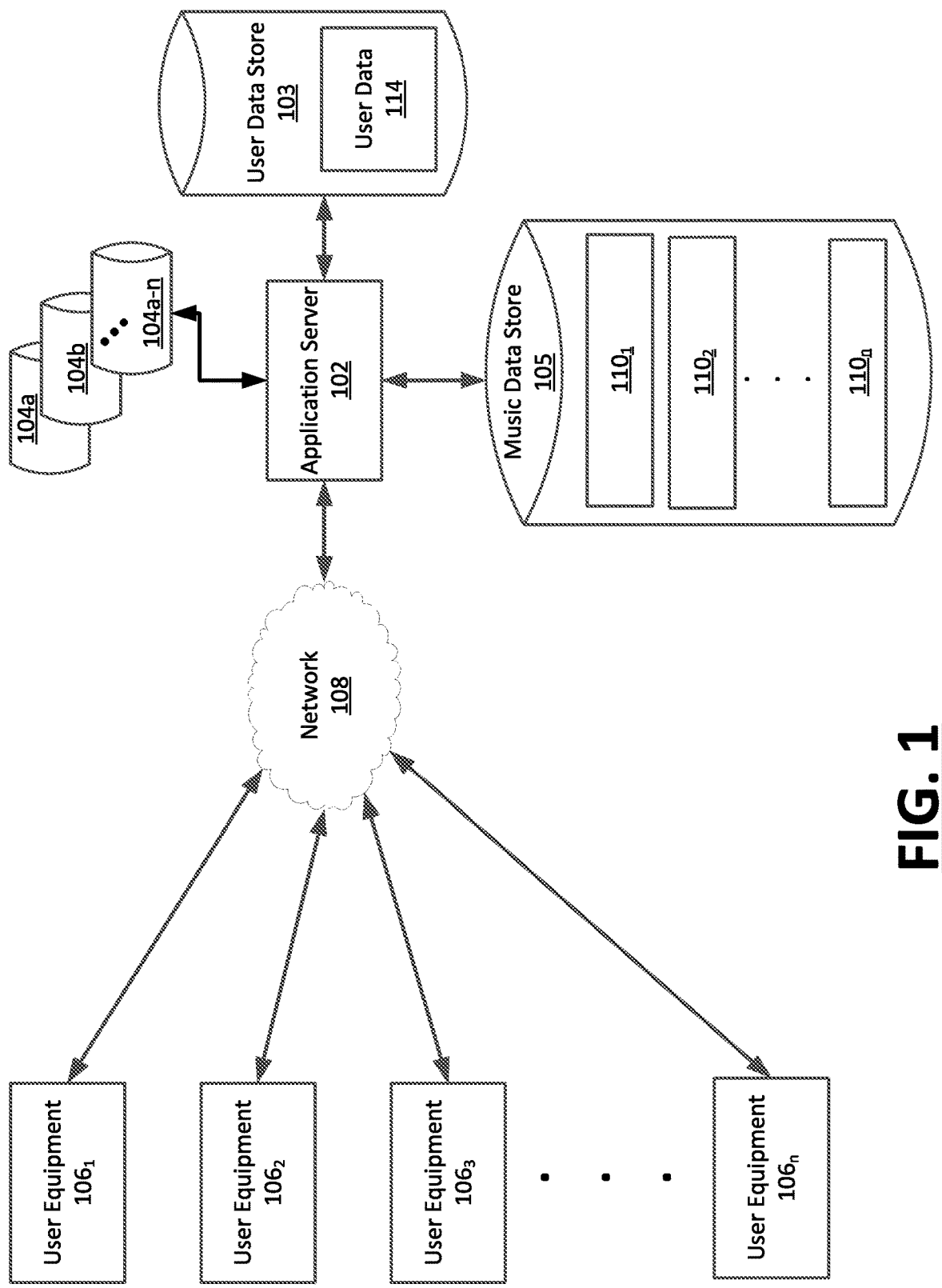
FIG. 1 is a conceptual diagram of a computer system that is useful for collaboratively creating, sharing and practicing musical harmonies.

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

A solution disclosed herein concerns a system including a Music Harmony Tool (MHT) and method of using same. For a performer (e.g., a vocalist) who seeks to learn, practice, share and/or collaboratively create harmonies there are a number of challenges which must be overcome. A harmony can involve a plurality of different parts in which performers are singing different notes at the same time. A singer seeking to create, learn or practice a harmony part must focus on the specific notes required for their part of the harmony without being distracted by other parts of the harmony. Further, different performers necessary for creating a harmony may be unavailable at the same time, may be physically separated by large distances and/or may have different skill levels requiring different amounts of practice time. Not all participants may want to participate in all practice sessions. But for singers with less experience, it can be difficult to master a particular harmony without the presence of others, and an inexperienced singer may not be able to tell when the harmony part they are singing is being performed properly. Accordingly, an MHT disclosed herein provides certain advantages for learning, creating, practicing and collaborating in regards to musical harmonies.

To perform a harmony, two or more performers or singers sing separate parts (e.g., soprano, tenor, alto, bass, mezzo-soprano, contralto, countertenor, baritone, etc.) at different pitches simultaneously. To save space, sheet music for a harmony will typically show all parts simultaneously as chords on a single music staff which may create ambiguity about which notes go with which performer's part. In this disclosure, assignment of one or more notes on the sheet music to a part and/or performer is referred to as "part mapping." Part mapping may be performed for one or more parts and/or performers on the sheet music.

Traditionally, part mapping is performed in a non-digital manner where a performer may highlight their assigned vocal line on the sheet music itself and make markups/edits with a pen or pencil to the highlighting as it changes. This is often not feasible for many performers, such as an inexperienced singer who does not know how to read sheet music, a performer who is new to the harmony and does not know his/her part, etc. An automated part mapping determination that does not rely on a performer's knowledge may overcome such limitations. Moreover, automated part mapping may be used to assign parts based on individual performer's capabilities and preferences, and may be automatically tailored for different performers. Finally, while manual part mapping is helpful for simple harmonies with clear separation between vocal parts, it may be inaccurate and/or may not work for vocal parts that overlap or when harmonies are more complex. The current disclosure describes methods and systems for performing automated part mapping that overcome the above limitations.

Referring now to FIG. 1 it can be observed that a system (e.g., an MHT system) for performing part mapping can in some scenarios include an application server 102 which has access to user data store 103, a music data store 105, and other data store(s) 104a-n. One or more clients comprising user equipment (UE) computer systems $106_1$-$106_n$ can communicate with the application server using a computer data network 108. The UE computer systems $106_1$-$106_n$ can comprise any suitable type of computing device that is capable of carrying out the methods and functions described herein. In some scenarios, the user equipment can comprise a desktop computer with suitable network interface connections to carry out certain data communication operations as described herein. In other scenarios, the user equipment can comprise a portable data communication device such as a smart phone, a tablet computer, or a laptop computer. Other types of computing systems which can be used for this purpose include dedicated computing devices which are designed to exclusively carry out the methodologies and functions described herein. Although a network-based arrangement is presented herein, it should be understood that several aspects of the solution can also be implemented in a non-networked computer system. These various aspects and features are described below in greater detail.

The application server 102 can comprise a computer program and associated computer hardware that provides MHT services to the UE computer systems $106_1$-$106_n$ to assist in carrying out one or more of the methods and functions described herein. The user data store 103 can contain certain user data 114 pertaining to individual users (e.g., performers of a harmony, music directors, song writers, harmony composers, etc.) who either have established user accounts to facilitate access and use of the MHT and/or are performers associated with user account holders. In some embodiments, the user data store 103 can comprise user account data such as passwords, email addresses, practice session scores reflecting user proficiency, and so on. The user data 114 can also include other types of user authentication data, digital certificates, and/or a transaction log. Optionally, the user data 114 may include historical information corresponding to a user such as, without limitation, previously mapped parts for a user using the MHT, information provided by a user in response to one or more prompts from the MHT, user preferences (e.g., solo singer or group singer, etc.), user vocal range(s), or the like. The music data store 105 can comprise music data files $110_1$, $110_2$ . . . $110_n$ associated with one or more songs, and corresponding information (e.g., previous part mappings, lyrics, accompaniments, etc.). Each of the music data files $110_1$, $110_2$, . . . $110_n$ can include digital data representative of one or more harmony parts created by one or more users. Data store(s) 104a-n can comprise information such as, without limitation, rules for performing part mapping, question prompts for users to receive information for performing part mapping, various statistical models for features or features that affect part mappings, real-world part mapped examples, or the like.

The computer data network 108 is comprised of a data communication network suitable to facilitate communication of data files, user data and other types of information necessary to implement the MHT and MHT services described herein. Computer network 108 can also facilitate sharing with UE computer systems $106_1$-$106_n$ certain computing resources that are available at application server 102. Exemplary networks which can be used for this purpose can include packet data networks operating in accordance with any communication protocol now known, or known in the future. The organizational scope of such network can include but is not limited to one or more of an intranet, an extranet, and the Internet.

The systems disclosed herein can facilitate creation of entirely new songs by the user. The user can record a harmony to begin the process and define that harmony as being part of a new song. Further, the user can create one or more harmony parts of the newly created song. Methods and systems for creating new songs, and creating one or more harmony parts are described in U.S. patent application Ser. No. 16/006,500 filed Jun. 12, 2018 which claims priority to U.S. provisional 62/518,433 filed on Jun. 12, 2017, the disclosures of which are incorporated herein by reference in their entirety.

In an embodiment, once a new song is created and/or a new sheet music is scanned, it may be added to the music data store 105 and part mapping for each harmony part may be performed before allowing performers to practice the new song for, for example, rehearsals, lessons, etc. Optionally, part mapping may be performed for a particular performer's parts in the harmony before that performer sings the song.

Figure 2:
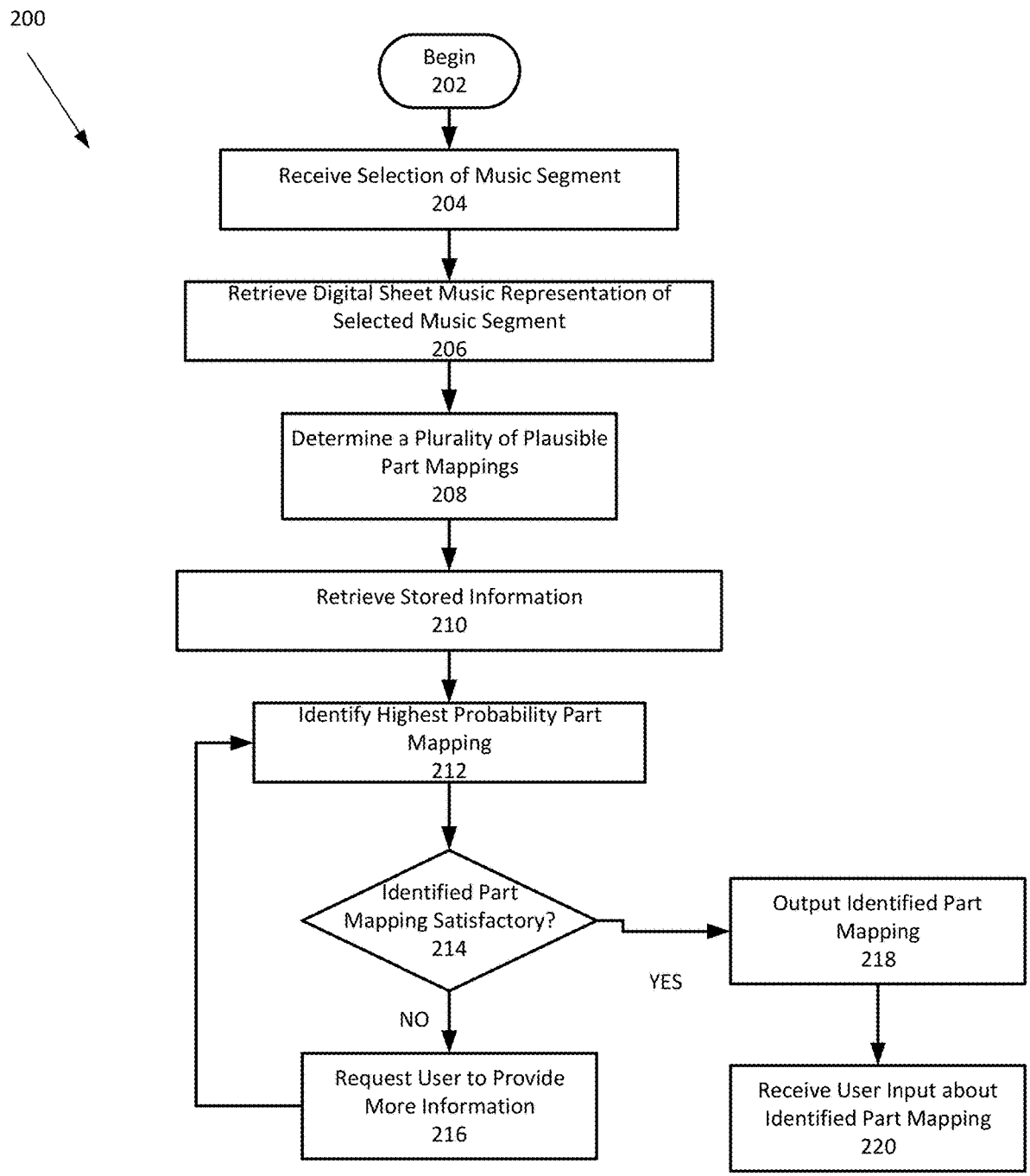
FIG. 2 is a flowchart illustrating an example method for performing part mapping for a music segment.

FIG. 2 is a flowchart illustrating an example method for performing part mapping for an unmapped song. While the method 200 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 11 but the process may be integrated and/or one or more steps may be performed together, simultaneously, or the steps may be performed in the order disclosed or in an alternate order.

FIG. 2 shows that an MHT process 200 can begin at 202 and continue at 204 where the system may receive a selection of a music segment for part mapping. In some scenarios, the music segment can comprise the entire musical composition or song. In other scenarios, the segment can comprise a portion of a musical composition or song.

Figure 3A:
FIGS. 3A and 3B are drawings that are useful for understanding how a user can interact with the user equipment to facilitate part mapping.

In certain embodiments, the system may receive the selection from a user (e.g., a performer who wishes to practice a song) via, for example, a graphical user interface (GUI) comprising a song selection screen. The GUI may, optionally, be displayed on a display screen of a UE (e.g. any one of UE $106_1$-$106_n$). An example GUI is illustrated in FIG. 3A that shows a song selection screen 300a for receiving a user's choice of a particular song from a music library. In some scenarios, the song selection can be presented on a display screen of a UE $106_1$-$106_n$. For example, this music library can be requested from an application server 102. Information concerning the selected music library can be displayed to the user in a screen similar to screen 300a shown in FIG. 3A. Once the music library is loaded, the user can interact with the GUI to subsequently select at 204 a particular song or music segment. According to one aspect, the display screen can be a touch screen display though which a user can select available functions by touching one or more of the selectable control elements. In other scenarios, a computer pointing device, keyboard, audio interface, or other type of user interface can be provided.

Alternatively and/or additionally, the system may automatically select a music segment for part mapping when, for example, a musical segment (e.g., a song) is created, when a new sheet music is scanned or uploaded into the data store 105, when a new user account is created, when a song is shared with one or more users, when information about a performer such a vocal range is updated, or the like.

At 206, the system may retrieve a digital representation of sheet music corresponding to the selected music segment (e.g., sheet music file). A sheet music includes music notes that comprise the music to be played or sung and their order, as well as the timing for their playing/singing, and may be written down in a form called musical notation. Such notation therefore will allow any performer who knows how to read such music to play/sing the music. Musical notation involves the use of symbols that stand for the various elements of the music to be played, including but not limited to: the staff, the clef, the key signature, the measure, the time signature, the tempo, and/or the like. For instance, a stave or staff is characteristically drawn out on a page of paper as a latticework consisting of a set of parallel lines where the notes to be sung are illustrated by the lines and spaces that are written down in the staff. The staff ordinarily includes five parallel horizontal lines, and four intervening spaces between them. Each line or space in the staff corresponds to a note having a particular pitch, and thus, represents a note in the scale of an octave that is to be sung. Such notes are designated on the staff by a note indicator whereby the line or space wherein the note indicator is positioned indicates which note of the scale is to be sung, and which type of note indicator used indicates for how long the note is to be sung. Hence, notes on a staff set forth the pitch of the music, whereby where the note indicator is positioned on the staff designates the pitch, e.g., high or low notes, to be sung. The staff may include additional symbols, such as a clef, a break, an accidental, a key signature, a time signature, codas, and the like, which symbols dictate the pitch, rhythm, tempo, and articulation of the notes to be played in performing the musical composition. Clefs define the pitch range of the particular staff on which it is placed. Particularly, a clef is employed as a sign, e.g., a key, that is positioned at the beginning of the staff, e.g., it is usually the leftmost symbol, and makes it possible for someone playing the written music to work such as to indicate a change in register for instruments with a wide range. Because there are only five lines in an ordinary staff, the clef functions as a designator to assign individual notes to the given lines and/or spaces of the staff.

Upon receipt of a selection of particular music segment (song and/or segment of a song) for part mapping and the corresponding digital sheet music file, the system may determine a plurality of possible part mappings for the selected music (208). As discussed above, a part mapping is an assignment of one or more notes on the sheet music to a part or performer (e.g., soprano, tenor, alto, bass, mezzo-soprano, contralto, countertenor, baritone, etc.). The plurality of part mappings may include all plausible part mappings for the selected music. Optionally, the plurality of part mappings may include a subset of all plausible part mappings for the selected music. For example, the subset may only include part mappings that are not ruled out as based on prior knowledge (e.g., a part mapping assigning group singing parts to a performer that the system knows is a solo singer, a part mapping that a user has previously discarded, etc.).

Figure 3B:
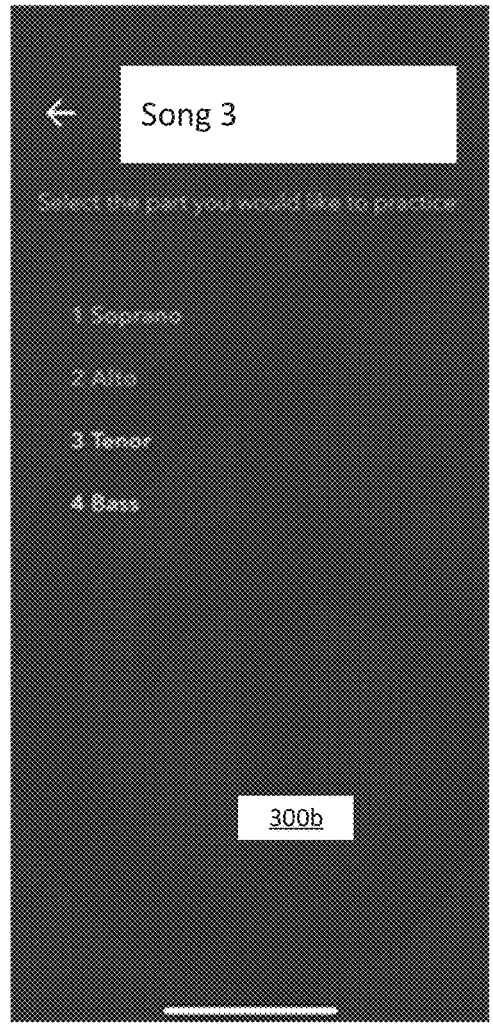

It should be noted that the system may map all the parts in the selected musical segment. For example, the system may identify a part mapping that includes all of the possible parts in the selected music segment. Alternatively, the system may map only a few parts in the selected musical segment. For example, the system may prompt a user to select one or more parts (for example, a part that the user wishes to perform, parts that the user wishes the system to perform, etc.), and may only map the selected part(s). For example, FIG. 3B illustrates a GUI 300*b* where the user has previously selected Song 3 from the music library and the system may display a GUI for the user to select a part for part mapping. Optionally, the system may automatically determine a part the user may be associated with based on previously received and stored information about the user.

The system may then retrieve stored information (210) for identifying the best part mapping for the music segment. For example, the system may retrieve the stored information from one or more data stores (e.g., music data store, user account data store, rules database etc.). Some of this information may be extracted from the digital sheet music file.

In some embodiments, the information may include music information about the music segment such as, without limitation, data comprising the selected music segment, musical notations, tempo indications, musical dynamics, previous part mappings, part mappings of other segments of a song or music composition that also includes the music segment, sheet music, information about musical staves, information about performers or instruments for each part or staff, information about lyrics, information about accompaniments to the music segment, or the like. For example, in response to a user selection of a particular song (e.g., Song 3 in FIG. 3A), the system may then retrieve certain data (e.g., music sheet,) comprising the selected music segment. For example, in some scenarios data comprising a segment of a particular musical selection or song $110_1$-$110_n$ can be retrieved from the music data store 105.

Optionally, the information may include user information about one or more performers who will sing the music segment based on the assigned part mapping. Examples of such information may include, without limitation, performer identification, the vocal range of performer(s), named part(s) the performer(s) are assigned, the staff the performer(s) sing on, notes the performer(s) voice, or the like. For example, such performer information can be retrieved from the user data store 104.

At 212, the system may use the retrieved stored information to analyze features of the part mappings and identify the best part mapping for the selected music segment from amongst the plurality of part mappings.

The system may identify the best part mapping based on one or more rules relating to one or more features of the part mappings. Examples of such features may include, without limitation, common vocal ranges, stable ordering of parts, repeated musical phrases in the music segment, repeated rhythms in the music segment, reinforcement of paired parts, sparsity of part mapping changes in the music segment, lyrics of the music segment, accompaniments of the music segment, performer identification, the vocal ranges of performer(s), the staff the performer(s) sing on, notes the performer(s) voice, or the like. The system may identify additional features or features based on real-world examples of part mappings.

The system may consider one or more of these features and associated data/information in identification of the best part mapping. Furthermore, these features may be given different weights in identification of the best part mapping. For example, rules or features that take into account information about performers of the music segment may be given a higher weight than rules that do not take into account such individual information. Such weights may be determined based on one or more statistical models developed/generated using of real-world examples of part mappings, and may vary based on the selected music segment. The weights may also depend on additional information and may be based on additional information about the music segment including but not limited to genre, artist, year the music was written, musical style, or the like.

In one or more embodiments, the system may continuously assign probabilities, points, ranking, etc. to the plurality of plausible part mappings and/or discard part mappings based on the above features and identify a part mapping that has the best score, ranking, probability, or the like. In certain embodiments, the best part mapping is a part mapping having a highest probability, ranking, score, etc. compared to the other part mappings. In the following discussion, while the current disclosure describes assigning probabilities (high, low, zero, or other numerical values, etc.) to the part mappings, the disclosure is not so limiting, and other scoring metrics and/or values associated with probabilities may be used.

Figure 4:
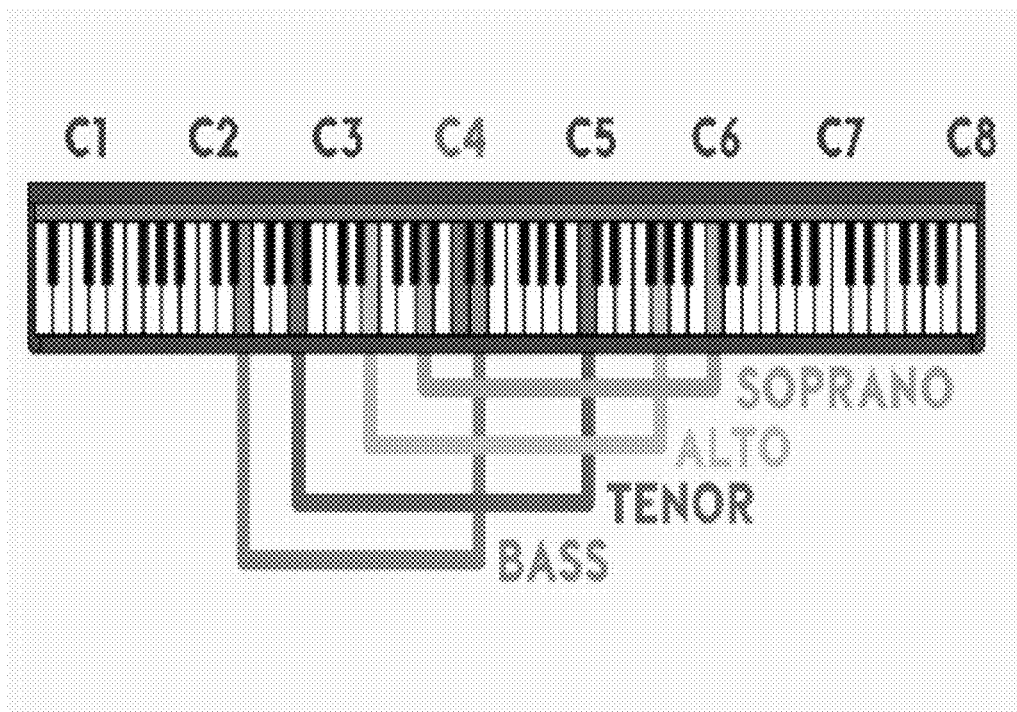
FIG. 4 is a drawing illustrating the example pitches in a four-part harmony.

For example, a rule relating to common vocal ranges of different parts may provide that a part should be assigned such that it correlates with the corresponding vocal range for that part. As used herein, vocal range is the range of notes, from lowest to highest, that a performer can vocalize or sing comfortably. It is highly improbable that a single part would include pitches typically sung by both bass and soprano performers, so such a part mapping would be assigned a low probability and/or may be discarded by the system. For example, a proposed part mapping that includes a part with both E2 (bass) and C6 (soprano) pitches in the same part (shown in FIG. 4) should be assigned a low probability because very few performers are able to sing both those notes correctly. As such, a part mapping that assigns notes to a part outside common vocal ranges should have a lower probability than those where every part has a limited vocal range plausible for a performer to perform. In other words, part mappings that result in narrower vocal ranges in a part are assigned a higher probability compared to those with wide ones. Therefore, the system may analyze the vocal range for a music segment for determining the probability for one or more part mappings for that segment, such that pitches for each part stay inside a common vocal range.

Optionally, if the retrieved information includes information about the individual vocal range of a performer and/or preferred part of a performer, the system may use such information in part mapping identification as well to reduce the probability associated with parts that are impossible or very difficult to voice by the performer. For example, if the system has information about the lowest and/or highest notes a performer can comfortably sing, the system may assign part mappings with notes outside this range to the performer's part a much lower probability than other part mappings that include notes for the performer's part within the vocal range.

A rule relating to stable ordering of parts may provide that in the selected music segment, ordering of parts (determined based on the number of parts) should remain the same during part assignments to notes. In an embodiment, the number of parts must be at least equal to the largest number of pitches-per-chord (i.e., every note must be assigned to at least one performer). Specifically, part mappings where the tonal order of performers "flips" are assigned lower probability than those where performers all stay in the same tonal order throughout the entire song (for example, a soprano should not typically sing a note that has a lower pitch than the alto). Based on this rule, the system may analyze the chord structure in the selected music segment and assign part mapping probability based on the tonal order.

For example, when the number of pitches-per-chord matches the number of performers, the system may assign a higher probability to part mappings that assign parts in order of vocal range (e.g., in a four-part harmony, a part mapping that assigns soprano to the highest pitch note, alto to the second highest pitch note, tenor to the third highest pitch note, and bass to the lowest pitch note may be given a high probability). However, when the number of pitches-per-chord is less than the number of performers, multiple performers may be assigned the same pitch. This may be done by taking into consideration that performers are unlikely to flip their order.

Figure 5:
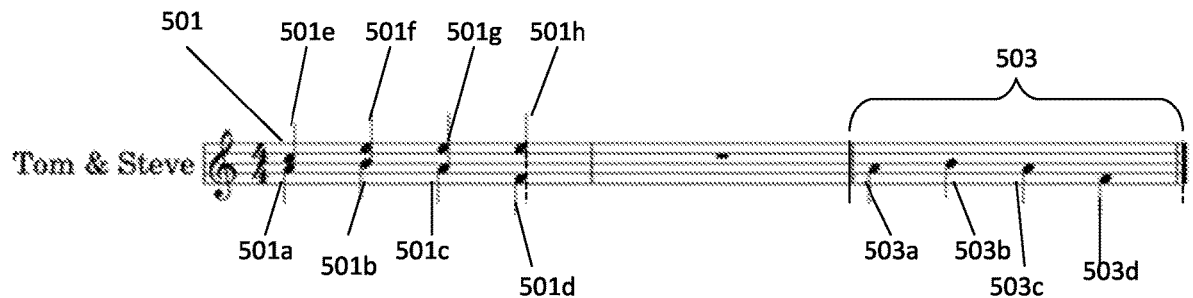
FIG. 5 is a drawing illustrating example part mapping identification for a music segment that includes repeated musical phrases.

Another rule may provide that repeated musical phrases (e.g., a short melody or group of notes) in a music segment should typically be voiced by the same part. Specifically, a part mapping should be identified such that the same part should be assigned to same musical phrases that are repeated across the music segment. For example, for a section of music shown in FIG. 5, if there is an ambiguity relating to a part to be assigned to the measure 503, the system may identify a part mapping for measure 503 that assigns the low notes 503*a*, 503*b*, 503*c*, and 503*d* of measure 503 the same part as the low notes of measure 501 (501*a*, 501*b*, 501*c*, and 501*d*), because it would be unusual for the performer of the high notes in measure 501 (501*e*, 501*f*, 501*g*, and 501*h*) to sing measure 503 alone. Optionally, the system may assign a higher probability to part mappings for measure 503 that assigns the low notes 503*a*, 503*b*, 503*c*, and 503*d* the same parts as the low notes of measure 501 (501*a*, 501*b*, 501*c*, and 501*d*).

Figure 6:
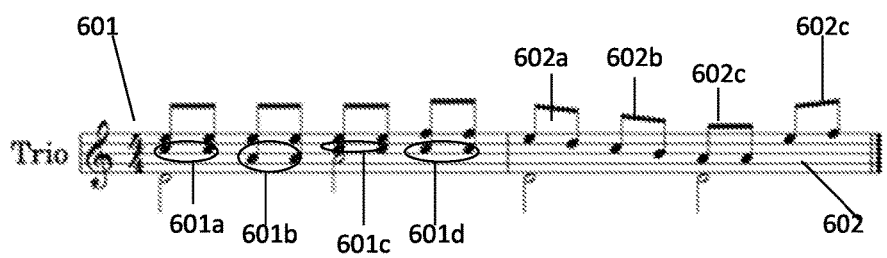
FIG. 6 is a drawing illustrating example part mapping identification for a music segment that includes repeated rhythms.

A rule may provide that similar rhythms should be voiced by the same part. Specifically, if the music segment contains a repetitive rhythm, it is more likely for a performer to "stick with their rhythm" for the song (e.g., a soprano part sings quick eighth notes while a bass part sings slower quarter notes, and will continue to do so throughout the music segment. For example, for a section of music shown in FIG. 6, it is ambiguous whether the middle part (i.e., part assigned to notes 601*a*, 601*b*, 601*c*, and 601*d*) from measure 1 601 sings the top or bottom part in measure 2 602, and based on the above rule, the system assigns a higher probability of them singing the top part, which has consistent rhythm, than the lower part. Specifically, part mappings assigning notes 602*a*, 602*b*, 602*c*, and 602*d* a top part are given a high probability.

Another rule may provide that if two parts sing together for a section a music segment (optionally, section of a threshold length, specific type, etc.), it is more likely they will sing together in other sections of the music segment as well. For example, if soprano and alto sing an introduction together, and the music segment has a section with a soprano and a second part together, the system may determine that part mappings with the same alto performer are more likely than part mappings with a third performer. Similarly, part mappings with consistent pairing throughout the song may be assigned a higher probability than other part mappings.

Optionally, some parts are more likely to sing together in one or more sections of the music segment than other parts. For example, while soprano and alto often sing multiple sections of a song together, it is less likely that alto and tenor will sing a section together. The system may determine such pairings based on, for example, the music segment, performers' vocal ranges, statistical models determined based on real-world examples of part-mappings, performer input, or the like.

Yet another rule may provide that major changes in the part mapping (e.g., a change in the number of parts, change in the parts that performers are singing, etc.) are more likely to occur together and/or may coincide with key, rhythm, or tempo changes. Therefore, part mappings with large changes during the music segment that occur together may be assigned a higher probability than part mappings with many small changes throughout the music segment.

Figure 7:
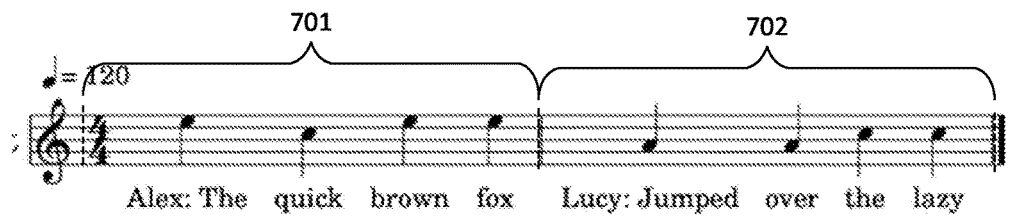
FIG. 7 is a drawing illustrating example part mapping identification for a music segment that includes information about lyrics.

In some scenarios, a rule set may provide that the system may use the lyrics of the music segment to help identify the part mapping. The system may do so by identifying additional information from the lyrics (depending on the notation style of the music segment) such as, without limitation, explicitly named parts, splitting of performers onto multiple lines, cues for new parts to enter the song, or the like. In some embodiments, each part will have different printed lyrics despite sharing the same musical staff, which may provide information for part mapping when note durations are not identical. The system may then use this information in part mapping identification. For example, for the music segment shown in FIG. 7, the system may determine from the lyrics notation that Alex sings the first part and Lucy sings the second part. The system may then assign a part mapping with one performer for the first measure 701 and a different performer for the second measure 702 is assigned a higher probability than other part mappings. It should be noted that for the music segment shown in FIG. 7, a part mapping with one performer singing the entire song would be less likely than normal, since two differently named lyric lines are rarely sung by one performer.

In some embodiments, a rule may provide that the system may use information about the accompaniments of the music segment to help identify the part mapping. For example, a performer may always sing along with a specific instrument. A higher probability may be assigned to part mappings with consistent accompaniment-performer pairs.

The system may also take into consideration rules relating to the information about various performers of the music segment. Examples of such rules may include, without limitation: (i) part mappings that include notes outside the individual vocal range(s) of the performer(s) should be assigned a very low probability (e.g., "0" probability); (ii) part mappings leading to a conflict with the staff on which a performer sing should be assigned a very low probability (e.g., "0" probability); (iii) if a performer voices a particular note when multiple notes are voiced together, any part mappings with conflicting assignments to the performer's preferred note should be assigned a very low probability (e.g., "0" probability); (iv) if a performer voices a particular note and/or lyric in the music segment, the system may assign a high probability to part mappings with the specific note and/or lyric assigned to the performer, and may reduce the probability of other part mappings that assign the specific note and/or lyric to other performers (e.g., "0" probability); (v) if a performer is known to sing a solo part in the music segment, the system may increase the probability of part mappings where the performer is assigned notes on a staff for solo parts (not part of a chord), and reduce the probability of other part mappings (e.g., assign "0" probability); (vi) if a performer is known to sing with a group, the system may increase the probability of part mappings where the performer is assigned a note in a chord, and the probability of part mappings where the performer is assigned a note by itself are decreased (performers singing with a group may still voice a few independent notes in many cases); or the like.

The system may take into account one or more of the above rules and features for identification of a part mapping, and may identify the part mapping with the highest probability taking into account such rules.

For example, in certain embodiments, the system may identify a part mapping solely based on two features only: pitches for each part stay inside a common vocal range, and ordering of parts in the music segment should remain the same (depending on the number of notes). In such embodiments, determination of part mapping probability may be understood with reference to the following equation:

$$P(\mathcal{M}) = e^{-\beta o'} \prod_{\mathcal{P} \in \mathcal{M}} e^{-\alpha |n_{min} - n_{max}|} \quad (1)$$

where, $P(\mathcal{M})$ is the probability of any mapping, o' is the the number of times parts change their ordering, $\mathcal{P}$ is the vocal range of each part which is computed as the difference between the maximum and minimum note value in the part $|n_{min} - n_{max}|$.

α, β are parameters to tune the relative importance of part reordering versus vocal ranges (example values of α=0.1, β=2.0).

In another embodiment, in addition to the above factors, the system may also take into consideration a performer's individual vocal range, where determination of part mapping probability may be understood with reference to the following equation:

$$P(\mathcal{M}) = e^{-\beta o'} e^{-\gamma v} \prod_{\mathcal{P} \in \mathcal{M}} e^{-\alpha |n_{min} - n_{max}|} \quad (2)$$

where, $P(\mathcal{M})$ is the probability of any mapping, o' is the the number of times parts change their ordering, v is the number of notes outside the individual performer's comfortable vocal range, $\mathcal{P}$ is the vocal range of each part which is computed as the difference between the maximum and minimum note value in the part $|n_{min} - n_{max}|$.

α, β, γ are parameters to tune the relative importance of part reordering versus vocal ranges (example values of α=0.1, β=2.0, γ=4.0).

Equations for consideration of additional features may similarly be derived without deviating from the principles of this disclosure. Furthermore, if a feature is unknown or uncertain the related parameter can be set to 0. For example, in equation (2), γ=0 when the vocal range of the performer is unknown.

The features and/or rules (and corresponding weightage) taken into account for identification of a part mapping may also depend on the amount of information available to the system. For example, if the vocal ranges of the performers are known to the system, a rule may require assigning a high probability to part mappings that keep notes inside those ranges. Similarly, if the accompaniment (instrumental) track is known to the MHT, it may be used to determine which part mapping is most appropriate. In another example, if the lyrics are known to the MHT, it may be used to determine the most suitable part mappings. In other examples, prior knowledge of the number of parts may also be useful in determination of the part mapping probability.

Figure 8:
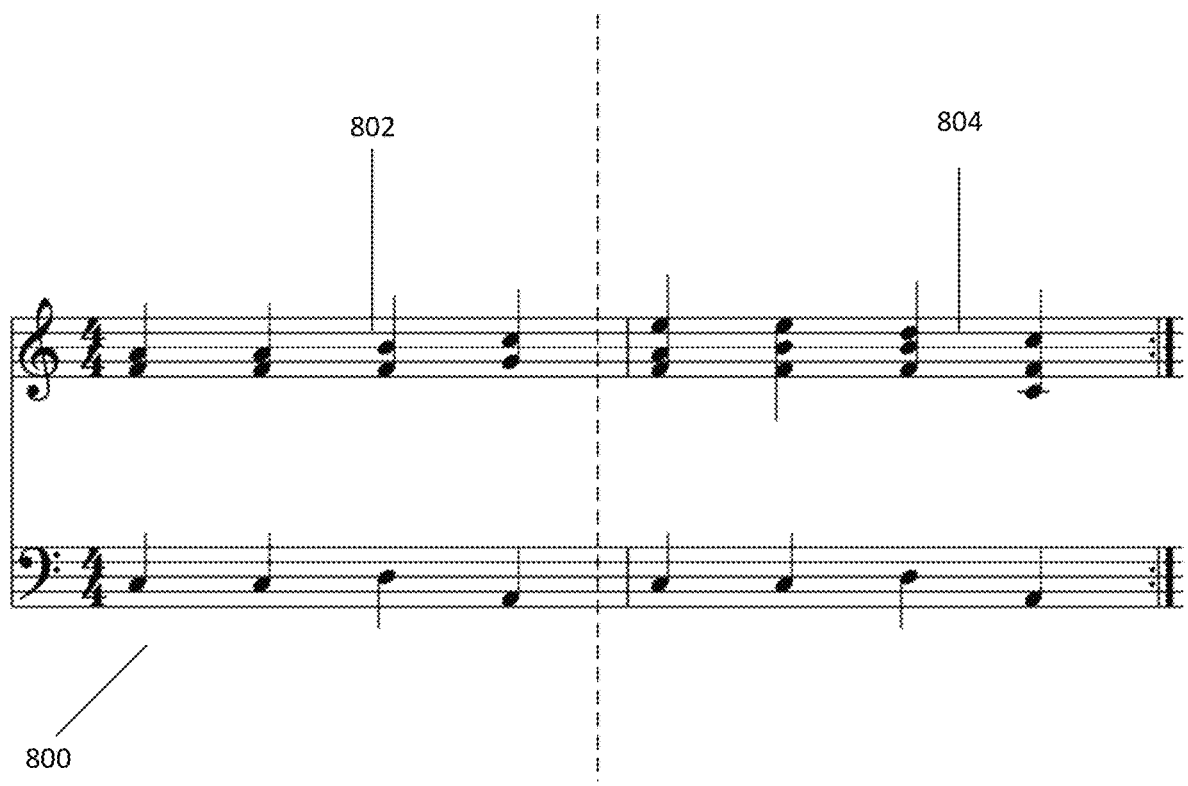
FIG. 8 is a drawing illustrating two example sections in a music segment.

In some embodiments, the system may identify the part mappings for the entire music segment at the same time. Alternatively and/or additionally, the system may divide the music segment into one or more sections, and identify the part mappings for each section separately until all the sections have a suitable part mapping. According to one aspect, the music segment may be divided into sections based on changes in the number of vocal parts between consecutive sections. This may be determined when the number of simultaneously sounded notes changes in a song. In other words, a new section is identified when the number of simultaneously sounded notes changes. For example, for the staff 800 displayed in FIG. 8, section 1 (802) has 3 simultaneously sounded notes displayed vertically on the staff, and Section 2 (804) has 4 simultaneously sounded notes displayed vertically on the staff, illustrating a change from three vocal parts to four vocal parts.

At 214, the system may determine whether the best part mapping identified based on the retrieved stored information is satisfactory. In some embodiments, the system may determine that the identified part mapping is satisfactory if, for example, it has an accuracy greater than or equal to a threshold accuracy, it has a probability greater than or equal to a threshold probability, user confirms the identified part mapping is satisfactory (214: YES), the number of part mappings identified is less than a threshold number (e.g., 1, 2, 3, or the like), a difference between the probability of the identified part mapping and the probability of the next best part mapping is greater than a threshold value (e.g., about 8-12%, about 9-11%, about 9%, about 12%, about 10%, etc.), or the like. Otherwise the system may determine that the best part mapping(s) identified in step 212 is not satisfactory (214: NO).

In some embodiments, the system may determine whether it can identify a part mapping before step 212 based on the retrieved stored information based on, for example, the type of music segment, amount of available stored information, type of available stored information, desired accuracy of the part mapping, or the like. For example, if the stored information does not include information performers of the music segment, and the system cannot accurately determine a part mapping without such information, the system may determine that is cannot identify a part mapping based on the retrieved stored information.

If the system determines that the identified part mapping is not satisfactory (214: NO), the system may request a user to provide more information (216) about one or more performers of the music segment. The system may request the user to provide the information by, for example, providing the user one or more queries via a suitable GUI. Such information and queries may relate to, for example and without limitation, (i) identification of a part that the performer routinely sings (e.g., "Choose between: soprano, alto, tenor, bass"); (ii) vocal range of a performer (e.g., "What is the lowest/highest note a performer can comfortably sing?"; (iii) the staff a performer voices (e.g., "Does the performer sing on the first, second, or third staff?"); (iv) notes a performer voices (e.g., "In this chord, does the performer sing the top or bottom note?"); (v) identification of one or more specific notes that a performer sings (e.g., "Does the performer sing the first note on measure 22?"); (vi) identification of one or more specific lyrics that a performer sings (e.g., "Does the performer sing the lyrics 'Row your boat' on measure 22?"); (vii) whether a performer sings solo or with a group; or the like. The system may retrieve the queries or questions from a data store.

In certain embodiments, the system may request all of the above information before repeating steps 212-214 to identify a satisfactory part mapping taking into consideration the user's responses. In certain other embodiments, the system may sequentially present the queries to the user, and may repeat steps 212-214 after receipt of a user response to each query until a satisfactory part-mapping is identified. Specifically, the system intelligently presents new queries based on user responses to previously presented queries, and only requests information that is sufficient to identify a satisfactory part mapping using the methods described above. The system may start requesting information by presenting the broadest query about a performer(s), and sequentially present narrower queries based on the information provided in response to the broader queries.

In an example scenario, the system may first request information relating to the individual vocal range of a performer. The system may use the received information to discard part mappings that assign notes to the performer outside of such vocal range because the performer cannot voice such note. In some embodiments, this may result in only one probable part mapping and the system may not need to request further information. For example, if the music segment is a duet with no ambiguous overlapping notes (e.g., soprano and bass performers), the system only needs the vocal range of one or both performers to identify a suitable part mapping. Any other possible part mapping would have a very low probability due to the feature that requires part mapping to respect the vocal range of performers, and the feature requires parts vocal ranges to be narrow enough to sing in practice.

If the system cannot identify a part mapping based on vocal range of performer(s), the system may then request information relating to the staff a performer sings on and/or whether a performer sings solo or in a group. Such information may be used to discard part mappings as being improbable and may result in only one probable part mapping (without need for additional information). For example, if a user chooses a staff with only one part for a performer on it, the system can assign the part to the performer without additional information. Similarly, if a user indicates that a performer sings "solo" and there is only one solo part, the system may identify the part mapping by assigning the solo part to the performer.

If the system cannot identify a part mapping based on the above information, the system can ask a user to identify the part the performer sings on the staff identified in response to the previous query. For example, if a performer sings on the 2nd staff and music segment is a duet, the system can request the user to identify whether the performer sings the top part or the bottom part, and identify a part mapping accordingly, without requesting further information.

If the system still cannot identify a satisfactory part mapping based on the above information (e.g., there are still two or more part mappings that are most likely), the system may prompt the user to provide answers to more specific queries such as identify a specific note or a specific lyric that the performer sings in the music segment, and use the information to identify part mappings as discussed above. In certain embodiments, the systems may prompt a user to map one or more parts in the music segment.

Figure 9:
FIG. 9 is a drawing that is useful for understanding how a system may present queries to a user on a user equipment to facilitate part mapping.

An example display 900 including sequentially narrower queries (902) for identification of part mapping in a sheet music file 901 is shown in FIG. 9.

The system may store the user responses in a data store for future reference and part mapping, such that it does not need to request the same information again with respect to a music segment and/or performers.

Referring back to FIG. 2, If the system determines that the identified part mapping is not satisfactory (214: YES), the system may output (218) the identified part mapping for the music segment in a suitable form that distinguishes notes assigned to different performers (e.g., color coded, grey scale, cross-hatched patterns, etc.). The output may include a printed document, presentation on a display screen of a UE $106_1$-$106_n$, an audible output, an electronic communication to a user (e.g., email), a communication to the music store 105 for storing the identified part mapping, or the like. Part mapped music segments stored in the data store 105 may be used for future practice, lessons, rehearsals, etc. For example, upon receipt of the part-mapped song, a user can select a particular harmony part that he wishes to sing. For example, in a scenario shown in FIG. 3B the user can select the part of soprano, alto, tenor or bass from a part selection screen 300b. In some scenarios, the text associated with each identified part can be visually coded in accordance with a pattern or color of part mapping. Once the system receives the user selection of a particular part that the user wishes to practice, the selected song is displayed to the user such that musical notes which correspond to the particular harmony part selected by the user can be highlighted or otherwise marked to facilitate identification.

In certain embodiments, the system may also add appropriate tempo and/or time signature changes to establish time changes in the sheet music while performing the part mapping.

Figure 10:
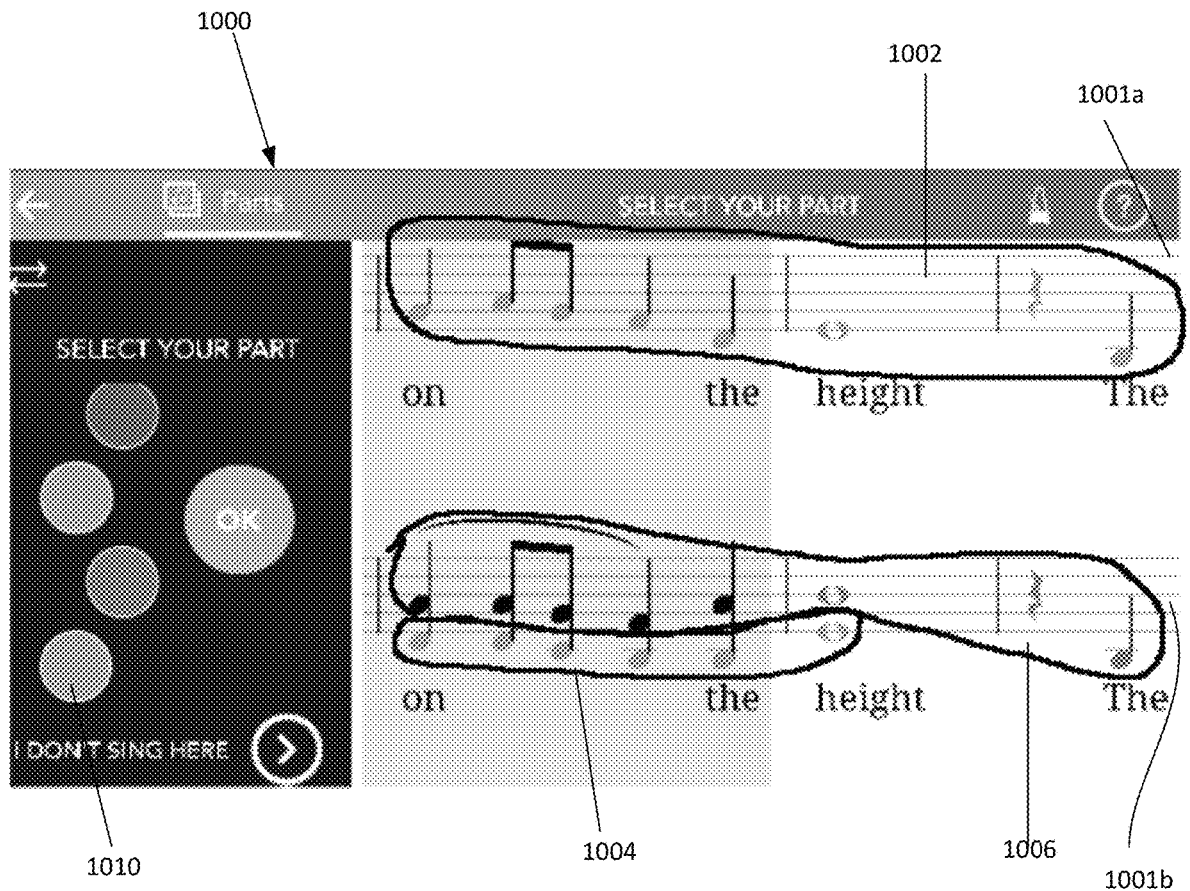
FIG. 10 is a drawing illustrating a part mapping display provided to a user.

For example, FIG. 10 illustrates a display 1000 that includes different parts determined based on the part mapping probabilities assigned using above described methods and illustrated in a grey-scale. As shown in FIG. 10, the soprano parts 1002 have been detected on the upper staff 1001a, the bass parts 1004 and the tenor parts 1006 on the lower staff 1001b, and are shown different shades of grey. A performer may highlight his/her part by clicking on the corresponding grey-scale shade on the selection screen 1010.

In certain embodiments, the system may receive 220 user input comprising at least one of the following: a confirmation that the identified part mapping is accurate, changes to the identified part mapping, and/or more information and instructions for repeating the identification step (step 210). For example, a user may drag notes on a UE to change the part mapping for that section. A user may also indicate that he will not be singing a section of the part mapping in order to prevent the MHT from assessing the user's singing on that section of the song.

The systems described herein can comprise one or more components such as a processor, an application specific circuit, a programmable logic device, a digital signal processor, or other circuit programmed to perform the functions described herein. Embodiments can be realized in one computer system or several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein.

Embodiments of the inventive arrangements disclosed herein can be realized in one computer system. Alternative embodiments can be realized in several interconnected computer systems. Any kind of computer system or other apparatus adapted for carrying out the methods described herein is suited. A typical combination of hardware and software can be a general-purpose computer system. The general-purpose computer system can have a computer program that can control the computer system such that it carries out the methods described herein. A computer system as referenced herein can comprise various types of computing systems and devices, including a server computer, a personal computer (PC), a laptop computer, a desktop computer, a network router, switch or bridge, or any other device capable of executing a set of instructions (sequential or otherwise) that specifies actions to be taken by that device. In some scenarios, the user equipment can comprise a portable data communication device such as a smart phone, a tablet computer, or a laptop computer.

Figure 11:
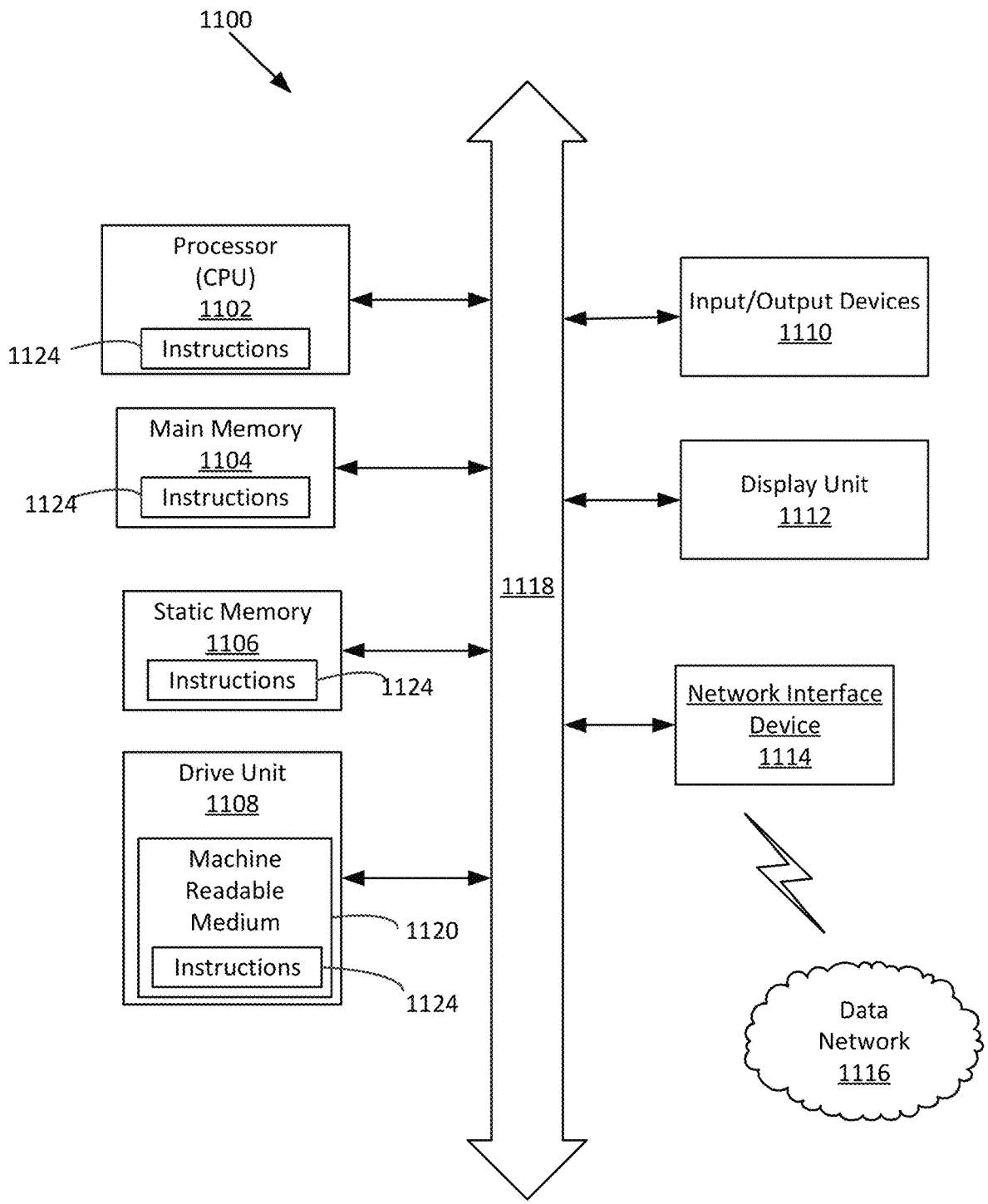
FIG. 11 is a block diagram of an exemplary computer system that can perform certain processing operations as described herein.

Referring now to FIG. 11, there is shown a hardware block diagram comprising a computer system 1100. The machine can include a set of instructions which are used to cause the computer system to perform any one or more of the methodologies discussed herein. In a networked deployment, the machine can function as a server, such as application server 102. In some scenarios, the exemplary computer system 1100 can correspond to each of the user equipment computer systems $106_1$-$106_n$. In some embodiments, the computer 1100 can operate independently as a standalone device. However, embodiments are not limited in this regard and in other scenarios the computer system can be operatively connected (networked) to other machines in a distributed environment to facilitate certain operations described herein. Accordingly, while only a single machine is illustrated it should be understood that embodiments can be taken to involve any collection of machines that individually or jointly execute one or more sets of instructions as described herein.

The computer system 1100 is comprised of a processor 1102 (e.g. a central processing unit or CPU), a main memory 1104, a static memory 1106, a drive unit 1108 for mass data storage and comprised of machine readable media 1120, input/output devices 1110, a display unit 1112 (e.g. a liquid crystal display (LCD), a solid state display, or a cathode ray tube (CRT)), and a network interface device 1114. Communications among these various components can be facilitated by means of a data bus 1118. One or more sets of instructions 1124 can be stored completely or partially in one or more of the main memory 1104, static memory 1106, and drive unit 1108. The instructions can also reside within the processor 1102 during execution thereof by the computer system. The input/output devices 1110 can include a keyboard, a mouse, a multi-touch surface (e.g. a touchscreen). The input/output devices can also include audio components such as microphones, loudspeakers, audio output jacks, and so on. The network interface device 1114 can be comprised of hardware components and software or firmware to facilitate wired or wireless network data communications in accordance with a network communication protocol utilized by a data network 1116.

The drive unit 1108 can comprise a machine readable medium 1120 on which is stored one or more sets of instructions 1124 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include magnetic media, solid-state memories, and optical-media and so on. More particularly, tangible media as described herein can include; magnetic disks; magneto-optical disks; CD-ROM disks and DVD-ROM disks, semiconductor memory devices, electrically erasable programmable read-only memory (EEPROM)) and flash memory devices. A tangible medium as described herein is one that is non-transitory insofar as it does not involve a propagating signal.

Embodiments disclosed herein can advantageously make use of well-known libraries such as OpenAL, AudioKit, or others to facilitate reading and writing of MP3 files and for handling audio input/output functions. These audio input/output functions can include for example microphone and speaker connectivity, volume adjustments, wireless networking functionality and so on). These embodiments may also make use of well-known libraries such as NAudio, Midi Toolkit, or others for reading, writing and manipulating MIDI and MusicXML files.

Computer system 1100 should be understood to be one possible example of a computer system which can be used in connection with the various embodiments. However, the embodiments are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments may implement functions in two or more specific interconnected hardware modules or devices with related control and data signals communicated between and through the modules, or as portions of an application-specific integrated circuit. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics of the various solutions disclosed herein can be combined in any suitable manner. One skilled in the relevant art will recognize, in light of the description herein, that the disclosed systems, devices and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the various solutions have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for mapping parts in a digital sheet music file for a harmony, said method comprising:
   receiving a selection of a music segment for part mapping;
   receiving a digital sheet music representation of the selected music segment;
   determining a plurality of plausible part mapping for the digital sheet music representation, wherein a part mapping identifies one or more distinct musical parts in the digital sheet music representation, each of said one or more distinct musical parts corresponding to a performer of the harmony;
   analyzing, based on previously stored information, one or more features of the plurality of plausible part mapping to identify a highest probability part mapping;
   determining whether the highest probability part mapping is satisfactory,
   in response to determining that the highest probability part mapping is not satisfactory, prompting a user to provide responses to one or more queries;
   identifying an updated part mapping based on the responses and the previously stored information; and
   outputting the highest probability part mapping or the updated part mapping.

2. The method of claim 1, wherein outputting the highest probability part mapping comprises presenting the highest probability part mapping to a user as a color coded sheet music, wherein the color coded digital sheet music comprises a distinct color for representing a musical part as being assigned to a performer of the harmony.

3. The method of claim 1, further comprising:
   dividing the received digital sheet music representation into one or more sections, each section having a different number of simultaneously sounded notes with respect to a neighboring section; and
   performing the identification step separately for each of the one or more sections.

4. The method of claim 1, wherein the previously stored information comprises at least one of the following: information about the selected music segment; or information about one or more performers of the harmony.

5. The method of claim 4, wherein information about the selected music segment comprises at least one of the following:
   data comprising the selected music segment;
   a plurality of musical notations;
   a previous part mapping;
   a part mapping of another music segment of a music composition that also includes the selected music segment;
   a sheet music file;
   information about musical staves;
   information about performers or instruments for each part or staff;
   information about lyrics of the music segment; or
   information about accompaniments to the music segment.

6. The method of claim 4, wherein information about one or more performers of the music segment comprises at least one of the following:
   identification of a part that a performer of the harmony routinely sings;
   vocal range of a performer of the harmony;
   the staff a performer of the harmony voices;
   notes a performer of the harmony voices;
   identification of one or more specific notes that a performer of the harmony sings;
   identification of one or more specific lyrics that a performer of the harmony sings; or
   information relating to whether a performer of the harmony sings solo or with a group.

7. The method of claim 1, wherein determining whether highest probability part mapping is satisfactory comprises determining that the part mapping is not satisfactory based on at least one of the following:

the highest probability part mapping has an accuracy less than a threshold accuracy;

the highest probability part mapping has a probability less than a threshold probability;

receipt of user instructions that the highest probability part mapping is not satisfactory; or a difference between the probability of the highest probability part mapping and a probability of a second highest probability part mapping is less than a threshold value.

8. The method of claim 1, wherein prompting the user to provide the responses to one or more queries comprises:

prompting the user to provide a response to at least one of the one or more queries;

identifying a first part mapping based on the response to the at least one of the one or more queries and the previously stored information;

determining whether the first part mapping is satisfactory; and repeating the prompting, identifying, and determining steps for another one of the one or more queries until the updated part mapping is identified.

9. The method of claim 1, wherein each of the one or more queries are related to performers of the harmony.

10. The method of claim 1, wherein each of the one or more queries are related to at least one of the following:

identification of a part that a performer of the harmony routinely sings;

vocal range of a performer of the harmony;

the staff a performer of the harmony voices;

notes a performer of the harmony voices;

identification of one or more specific notes that a performer of the harmony sings identification of one or more specific lyrics that a performer of the harmony sings; or information relating to whether a performer of the harmony sings solo or with a group.

11. The method of claim 1, wherein the one or more features include at least of the following:

common vocal ranges for the plurality of musical parts;

stable ordering of musical parts in the harmony;

a number of notes in the music segment;

repeated musical phrases in the music segment;

repeated rhythms in the music segment;

reinforcement of paired musical parts in the music segment;

sparsity of part mapping changes in the music segment;

lyrics of the music segment;

accompaniments of the music segment; or information about one or more performers of the harmony.

12. The method of claim 1, further comprising assigning a weight to one or more of the features, said weights determined based on statistical models determined based on real-world examples of part mappings.

13. The method of claim 1, wherein outputting the highest probability part mapping comprises storing the highest probability part mapping for use by a performer of the harmony.

14. A system for mapping parts in a digital sheet music file for a harmony, said system comprising:

a user interface;

a processor; and non-transitory computer readable medium comprising one or more programming instructions that when executed by the processor, will cause the processor to:

receive a selection of a music segment for part mapping, receive a digital sheet music representation of the selected music segment, determining a plurality of plausible part mapping for the digital sheet music representation, wherein a part mapping identifies one or more distinct musical parts in the digital sheet music representation, each of said one or more distinct musical parts corresponding to a performer of the harmony, analyze, based on previously stored information, one or more features of the plurality of plausible part mapping to identify a highest probability part mapping, determine whether the highest probability part mapping is satisfactory;

in response to determining that the highest probability part mapping is not satisfactory, prompt a user to provide responses to one or more queries;

identify an updated part mapping based on the responses and the previously stored information, and output the highest probability part mapping or the updated part mapping.

15. The system of claim 14, wherein the programming instructions that when executed cause the processor to output the highest probability part mapping further comprise programming instructions to cause the processor to present the highest probability part mapping to a user on a display included in the user interface as a color coded sheet music, wherein the color coded digital sheet music comprises a distinct color for representing a musical part as being assigned to a performer of the harmony.

16. The system of claim 14, further comprising programming instructions that when executed by the processor, will cause the processor to:

divide the received digital sheet music representation into one or more sections, each section having a different number of simultaneously sounded notes with respect to a neighboring section; and perform the identification step separately for each of the one or more sections.

17. The system of claim 14, wherein the previously stored information comprises at least one of the following: information about the selected music segment; or information about one or more performers of the harmony.

18. The system of claim 17, wherein information about the selected music segment comprises at least one of the following:

data comprising the selected music segment;

a plurality of musical notations;

a previous part mapping;

a part mapping of another music segment of a music composition that also includes the selected music segment;

a sheet music file;

information about musical staves;

information about performers or instruments for each part or staff;

information about lyrics of the music segment; or information about accompaniments to the music segment.

19. The system of claim 17, wherein information about one or more performers of the music segment comprises at least one of the following:

identification of a part that a performer of the harmony routinely sings;

vocal range of a performer of the harmony;

the staff a performer of the harmony voices;

notes a performer of the harmony voices;

identification of one or more specific notes that a performer of the harmony sings;

identification of one or more specific lyrics that a performer of the harmony sings; or information relating to whether a performer of the harmony sings solo or with a group.

20. The system of claim 14, wherein programming instructions that when executed by the processor, cause the processor to determine whether the highest probability part mapping is satisfactory further comprise programming instructions to cause the processor to determine that the part mapping is not satisfactory based on at least one of the following:

the highest probability part mapping has an accuracy less than a threshold accuracy;

the highest probability part mapping has a probability less than a threshold probability;

receipt of user instructions that the highest probability part mapping is not satisfactory; or a difference between the probability of the highest probability part mapping and a probability of a second highest probability part mapping is less than a threshold value.

21. The system of claim 14, wherein the programming instructions that when executed by the processor, cause the processor to prompt the user to provide the responses to one or more queries further comprise programming instructions to cause the processor to:

prompt, via the user interface, the user to provide a response to at least one of the one or more queries;

identify a first part mapping based on the response to the at least one of the one or more queries and the previously stored information;

determine whether the first part mapping is satisfactory; and repeat the prompting, identifying, and determining steps for another one of the one or more queries until the updated part mapping is identified.

22. The system of claim 14, wherein each of the one or more queries are related to performers of the harmony.

23. The system of claim 14, wherein each of the one or more queries are related to at least one of the following:

identification of a part that a performer of the harmony routinely sings;

vocal range of a performer of the harmony;

the staff a performer of the harmony voices;

notes a performer of the harmony voices;

identification of one or more specific notes that a performer of the harmony sings identification of one or more specific lyrics that a performer of the harmony sings; or information relating to whether a performer of the harmony sings solo or with a group.

24. The system of claim 14, wherein the one or more features include at least of the following:

common vocal ranges for the plurality of musical parts;

stable ordering of musical parts in the harmony;

a number of notes in the music segment;

repeated musical phrases in the music segment;

repeated rhythms in the music segment;

reinforcement of paired musical parts in the music segment;

sparsity of part mapping changes in the music segment;

lyrics of the music segment;

accompaniments of the music segment; or information about one or more performers of the harmony.

25. The system of claim 14, further comprising programming instructions that when executed by the processor, will cause the processor to assign a weight to one or more of the features, said weights determined based on statistical models determined based on real-world examples of part mappings.

* * * * *